(12) United States Patent
Fleureau et al.

(10) Patent No.: US 11,064,213 B2
(45) Date of Patent: Jul. 13, 2021

(54) METHOD AND APPARATUS FOR EMBEDDING KEY INFORMATION IN AN IMAGE

(71) Applicant: INTERDIGITAL VC HOLDINGS, INC., Wilmimgton, DE (US)

(72) Inventors: Julien Fleureau, Rennes (FR); Renaud Dore, Rennes (FR); Thierry Tapie, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/472,761

(22) PCT Filed: Dec. 11, 2017

(86) PCT No.: PCT/EP2017/082166
§ 371 (c)(1),
(2) Date: Jun. 21, 2019

(87) PCT Pub. No.: WO2018/114417
PCT Pub. Date: Jun. 28, 2018

(65) Prior Publication Data
US 2019/0349597 A1    Nov. 14, 2019

(30) Foreign Application Priority Data
Dec. 21, 2016 (EP) .................... 16306764

(51) Int. Cl.
*H04N 19/467* (2014.01)
*H04N 19/44* (2014.01)
(Continued)

(52) U.S. Cl.
CPC .......... *H04N 19/467* (2014.11); *H04N 19/44* (2014.11); *H04N 19/597* (2014.11); *H04N 19/65* (2014.11); *H04N 19/70* (2014.11)

(58) Field of Classification Search
CPC ....... H04N 19/467; H04N 19/65; H04N 19/70
(Continued)

(56) References Cited

U.S. PATENT DOCUMENTS

| 9,197,905 B2 | 11/2015 | Wang et al. |
| 2007/0297694 A1 | 12/2007 | Kurata |
| 2014/0092989 A1* | 4/2014 | Wang .................... H04N 19/46 375/240.26 |

FOREIGN PATENT DOCUMENTS

| CN | 102893602 A | 1/2013 |
| CN | 105227961 A | 1/2016 |

(Continued)

OTHER PUBLICATIONS

Chen, Tao, et al, "Robust spatial LSB watermarking of color images against JPEG compression," 2012 IEEE Fifth International Conference on Advanced Computational Intelligence (ICACI), Nanjing, 2012, pp. 872-875.

(Continued)

*Primary Examiner* — On S Mung
(74) *Attorney, Agent, or Firm* — Invention Mine LLC (57) ABSTRACT

The present disclosure relates to method for embedding key information in an image, the method comprising reserving a range of DMZ values, in a predetermined range of $2^N$ values used for storing useful data in the image, the reserved range being used for storing a key information associated with at least one coordinates in the image, with N>0 and DMZ<<$2^N$.

14 Claims, 3 Drawing Sheets

(51) Int. Cl.
*H04N 19/597* (2014.01)
*H04N 19/65* (2014.01)
*H04N 19/70* (2014.01)

(58) Field of Classification Search
USPC .................................................... 375/240.12
See application file for complete search history.

(56) References Cited

FOREIGN PATENT DOCUMENTS

| EP | 0952728 | A2 | 10/1999 |
| EP | 2539895 | A2 | 1/2013 |
| JP | 2004236230 | A | 8/2004 |
| JP | 2004236230 | A2 | 8/2004 |
| JP | 2006074338 | A | 3/2006 |
| JP | 2006074338 | A2 | 3/2006 |

OTHER PUBLICATIONS

Bender W., et al, "Techniques for data hiding," in IBM Systems Journal, vol. 35, No. 3 & 4, pp. 313-335, 1996.

Wen-Nung, Lie, et al, "Data hiding in images with adaptive numbers of least significant bits based on the human visual system," Proceedings 1999 International Conference on Image Processing (Cat. 99CH36348), Kobe, 1999, pp. 286-290 vol. 1.

Smitha, M., et al, "Image encryption using separable reversible data hiding scheme," 2013 Fourth International Conference on Computing, Communications and Networking Technologies (ICCCNT), Tiruchengode, Jul. 2013, pp. 1-6.

Celik, G., et al, "Lossless generalized-LSB data embedding," in IEEE Transactions on Image Processing, vol. 14, No. 2, pp. 253-266, Feb. 2005.

\* cited by examiner

METHOD AND APPARATUS FOR EMBEDDING KEY INFORMATION IN AN IMAGE

This application claims the benefit, under 35 U.S.C. § 365 of International Application PCT/EP2017/082166, filed Dec. 11, 2017, which was published in accordance with PCT Article 21(2) on Jun. 28, 2018, in English, and which claims the benefit of European Patent Application No. 16306764.8, filed Dec. 21, 2016.

1. TECHNICAL FIELD

The field of the disclosure is that of the image and video processing.

More specifically, the disclosure relates to a method for embedding key information in an image, so as to optimize the decoding of this image.

2. BACKGROUND ART

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Figure 1A:
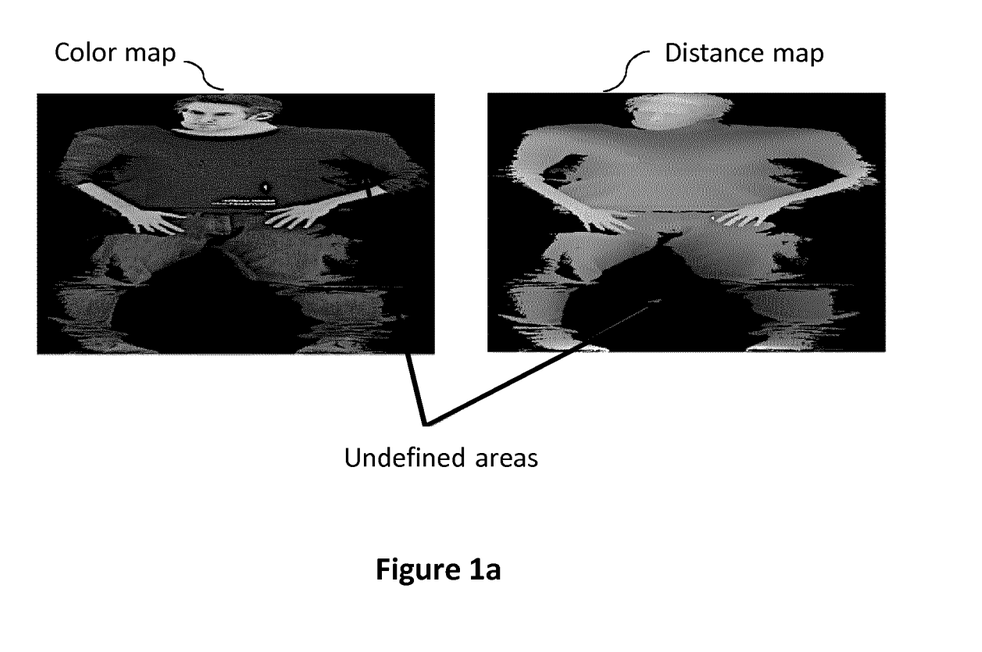
FIGS. 1a and 1b illustrate respectively an example of images with undefined values and a key map, according to prior art.

In the field of image coding and decoding, the decoding side needs to know/recognize some information, so as to optimize the decoding of an image. It is for example the case when certain areas in an image (for example a color map or a distance map, as illustrated in FIG. 1a) contain undefined values, which should not be decoded, at the risk of producing outliers for example.

Figure 1B:
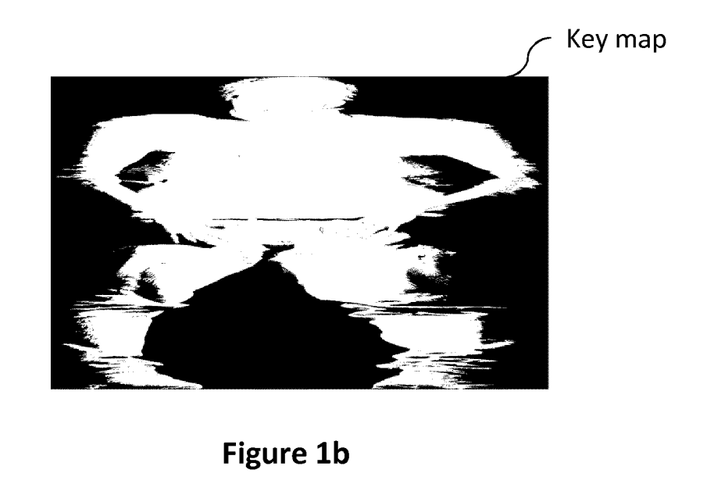

A known solution for "informing" the decoder would then consist in transmitting the information whether a value should be decoded or not as an additional binary map, namely a "key map" (for example illustrated in FIG. 1b, corresponding to the color and distance maps of FIG. 1a), which would for example contain only the defined values and thus would disambiguate the task on the decoding side. However, transmitting such an additional map may make the global framework more complex by adding an extra stream, which could also increase quite notably the final bitrate.

It is also well known to reserve a value, in an image, so as to embed key information needed at the decoding side. However, a drawback with such solutions is that this specific reserved value could be modified by the video encoding step, and the associated information misunderstood on the decoding side.

Therefore, there is a need for a new method for embedding key information in an image while optimizing the complexity of coding and decoding, as well as the final bitrate for the image transmission.

3. SUMMARY OF INVENTION

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method for embedding key information in an image, the method comprising reserving a range of DMZ values, in a predetermined range of $2^N$ values used for storing useful data in the image, the reserved range being used for storing a key information associated with at least one coordinates in the image, with $N>0$ and $DMZ<<2^N$.

Thus, the present disclosure proposes a new and inventive solution for embedding a key information in an image, in a robust and compact manner, so as to optimize the decoding of said image.

For this, it is proposed to store a key information in a range of values reserved in a predetermined range of values used for storing useful data in the image. Thus, the predetermined range of values used for useful data is shorten, so as to store the key information.

This solution first prevents from transmitting an additional image for embedding key information, as in known solutions. Moreover, this solution also prevents from simply reserving a predetermined value for the key information, which may be modified by the encoding step and thus may be misunderstood on the decoding side.

For example, this solution may take advantage of an oversized predetermined range of values, regarding the useful data to be stored in.

According to a particular characteristic, the method further comprises encoding the image and the size DMZ of the reserved range is updated according to a level of video compression applied in the encoding.

Thus, according to this embodiment, the size of the reserved range can be updated according to the level of video compression that will be used to encode the image. Thus, such an adaptive size allows taking account of the encoding artifacts (encoding errors) and minimizing the impact of the embedding of key information on the dynamic allowed for storing the useful data.

According to a specific feature, the size DMZ of the reserved range is updated according to at least one characteristic of the image.

Thus, according to this embodiment, the size of the reserved range can also be updated according to the image itself, for example according to the real dynamic needed for storing useful data (e.g. an image with close and far objects, or only close objects, or only far objects).

According to a particular characteristic, the method further comprises, for at least one coordinates in the image:
 if no useful data is associated with the coordinates, storing a key information in the reserved area,
 if useful data is associated with the coordinates:
  applying a modified quantization to the useful data for providing a modified useful data, the modified quantization taking account of the reserved range, and
  storing the modified useful data in the predetermined range of values except the reserved range.

Thus, according to this embodiment, a key information is stored in the reserved range if no useful data is associated to a position/coordinates in the image (e.g. for an unused point in the corresponding point cloud), whereas a modified (through a modified quantization) useful data is stored in the rest of the predetermined range (except the reserved range).

Thus, on the decoding side, if a received value pertains to the reserved range, the corresponding point is discarded and considered as unused.

For example, the image corresponds to a distance map obtained after projection on a parametric surface of a point cloud representing at least one part of an object in a multimedia content; useful data corresponds to an information representative of distance between the at least one part of the object and the parametric surface, for at least one point in the point cloud, corresponding to one coordinates in the image; the key information is representative of an unused point, and the reserved range corresponds to the first DMZ values of the predetermined range of $2^N$ values, the size DMZ being adaptive.

Thus, according to this embodiment, the method applies to a distance map corresponding to an image (or an object, or a part of an object in an image) of a multimedia content (for example a video content) wherein useful data corresponding to distance values for each position in the image are stored.

Indeed, in such a context, it appears that at some positions/coordinates in the distance map no useful value exists (for example if no projection occurs) thus leading to "unused" points that must not be decoded. These unused points should be known on the decoding side so as to be discarded. For that, a range of values reserved at the beginning of the range of distance values is used to embed the key information corresponding to such an unused point.

The method, according to this embodiment, takes advantage of the fact that the range of distance map values is generally (i.e. in most cases of multimedia content) oversized regarding the distance values to be stored in. Thus, it is not prejudicial to reserve a part of this predetermined range of values for key information. Moreover, as the distance value is classically represented as a clipped reverse function of the distance to give more dynamic and favor the close distances, it is still less prejudicial to reserve the beginning of the range values, as the first values are used for very far objects.

Finally, the size of the reserved range is adaptive, in order to take advantage of particularity of the image to be coded for example.

According to a particular embodiment, the key information is set to a value $V_k=0$ and the modified useful data corresponds to:

$V_u = U_{DMZ}(z) = \text{floor}((2^N - DMZ)\, Z(z) + DMZ)$, with z the distance value and $$Z(z) = \frac{z_{min}\left(\frac{z_{max}}{z} - 1\right)}{z_{max} - z_{min}}$$

where $z_{min}$ and $z_{max}$ define the clipping range with $Z(z_{min})=1$ and $Z(z_{max})=0$.

The present disclosure also relates to a method for decoding an image corresponding to a representation of at least one part of an object of a multimedia content, the method comprising, for a value W read for at least one coordinates in the image:
- if W belongs to a reserved range provided by the method for embedding key information as previously disclosed, discarding the read value W;
- if W do not belong to a reserved range provided by the method for embedding key information as previously disclosed, recovering the useful data corresponding to the read value W by applying an inverse modified quantization to the read value W, the inverse modified quantization taking account of the reserved range.

Thus, according to this embodiment, on the decoding side, if a received value pertains to the reserved range, the corresponding point is discarded and considered as unused. On the contrary, if a received value is out of the reserved range (i.e. greater), the corresponding point is considered as valid and the associated distance value is recovered by modifying the received value in order to apply the inverse quantization as the one applied on the coding side.

The present disclosure also relates to a stream carrying an image embedding key information, the image storing a key information in a range of DMZ values reserved in a predetermined range of $2^N$ values used for storing useful data in the image, the key information being associated with at least one coordinates of the image, with N>0 and DMZ<<$2^N$.

The present disclosure also relates to an apparatus configured to embed key information in an image, the apparatus comprising a memory associated with at least one processor configured to reserve a range of DMZ values, in a predetermined range of $2^N$ values used for storing useful data in the image, the reserved range being used for storing a key information associated with at least one coordinates in the image, with N>0 and DMZ<<$2^N$.

The present disclosure also relates to an apparatus configured to decode an image corresponding to a representation of at least one part of an object of a multimedia content, the apparatus comprising a memory associated with at least one processor configured to, for a value W read for at least one coordinates in the image:
- if W belongs to a reserved range provided by the apparatus configured to embed key information as previously disclosed, discard the read value W;
- if W do not belong to a reserved range provided by the apparatus configured to embed key information as previously disclosed, recover the useful data corresponding to the read value W by applying an inverse modified quantization to the read value W, the inverse modified quantization taking account of the reserved range.

The present disclosure also relates to a computer program product comprising program code instructions to execute the steps of the method for embedding key information in an image as previously disclosed, when said program is executed on a computer or a processor.

The present disclosure also relates to a non-transitory computer-readable carrier medium having stored therein instructions for causing a processor to perform at least the abovementioned method for embedding key information in an image, when this program is executed on a computer.

4. BRIEF DESCRIPTION OF DRAWINGS

Other features and advantages of embodiments shall appear from the following description, given by way of indicative and non-exhaustive examples and from the appended drawings, of which.

5. DESCRIPTION OF EMBODIMENTS

In all of the figures of the present document, the same numerical reference signs designate similar elements and steps.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

Figure 2A:
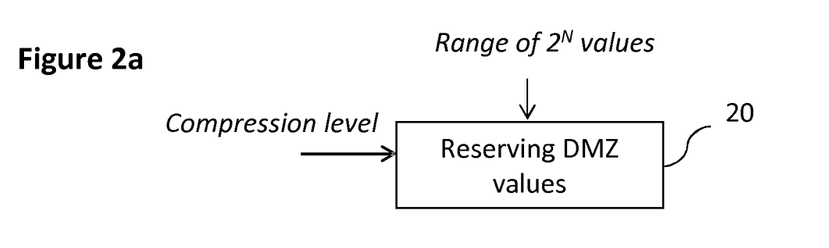
FIGS. 2a and 2b are respectively a flowchart of an embodiment of the disclosed method and an example of a reserved range of values according to an embodiment of the disclosed method.
Figure 2B:
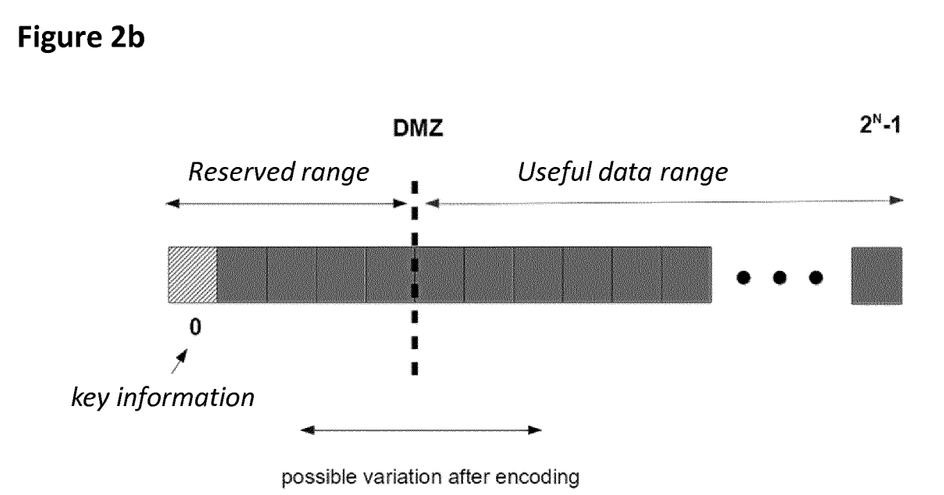

The present principles will be described in reference to a particular embodiment of a method of embedding key information in an image, so as to optimize the decoding of this image, as illustrated in FIGS. 2a and 2b.

The general principle of the disclose method is based on reserving, in a predetermined range of $2^N$ values used for storing useful data in an image, a smaller range of values (of size DMZ<<$2^N$) for storing a key information. For example, the key information is associated with at least one coordinates in the image and need to be recognized as a value to be discarded on the decoding side, and not as a useful data.

As no specific values are predetermined for embedding key information but a range of values is reserved and used, the disclosed method is thus robust to encoding artifacts. Indeed, even if the encoding modifies the key information, it should not vary outside the reserved range of values, so that, on decoding side, it can be recognized as a value to be discarded and not decoded.

For that, the size DMZ of the reserved range may be adaptively refined depending on the compression level used for encoding the image (to be robust enough to encoding artifacts). Indeed, a too high value for DMZ (i.e. a too large reserved range of values for key information) may waste a part of the dynamic allowed to the useful data of the image whereas a too low value (i.e. a too small reserved range of values for key information) may induce too much encoding artifacts (bad transmission of the key information).

The size DMZ of the reserved range may also be adaptively refined depending on the image itself, i.e. on the real dynamic needed for storing useful data in the image.

Thus, a multi-pass strategy could be considered in order to set the optimal value of DMZ, for a given image and a given level of compression. For each pass, a candidate value would be tested, on the encoding side as well as on the decoding side, starting from a minimal initialization and increased progressively if too much encoding artifacts are observed. In any case the DMZ value should be known at the decoding time to properly decode the image information.

For example, such multi-pass strategy may be implemented so as to adapt the size DMZ for each GOP (Group Of Picture).

According to a particular embodiment of the disclosed method, the image embedding the key information, as well as useful data, corresponds to a distance map, for example obtained from previous steps of encoding a source image. Thus, in that case, the predetermined range of $2^N$ values corresponds to the dynamic range of values used for storing distance values, for each coordinates in the image corresponding to a useful distance value.

However, as this distance map/image may present some areas that contain undefined values (for example where no projection occurred) that should not be decoded, the reserved range of size DMZ thus corresponds to a part of this distance map dynamic, that will be used for storing a key information for each coordinates in the image with no associated distance value.

A distance map/image may be obtained after a projection on a parametric surface of a 3D point cloud representing at least a part of an object in a multimedia content. Such a distance map/image contains the information of distance z between the projected point and the original 3D point. This information of distance z, when existing, is required on the decoding side to properly recover the point cloud and is classically represented as a clipped reverse function Z(z) of the distance so as to give more dynamic and favor the close distances. For example, this clipped reverse function Z(z) can be formulated as:

$$Z(z) = \frac{z_{min}\left(\frac{z_{max}}{z} - 1\right)}{z_{max} - z_{min}}$$

where $z_{min}$ and $z_{max}$ define the clipping range with $Z(z_{min})=1$ and $Z(z_{max})=0$.

This quantity Z(z) is then quantified and stored as an unsigned integer U(z), on N bits (typically 10 or 12), such as:

$$U(z)=\text{floor}(2^N Z(z)).$$

Figure 2C:
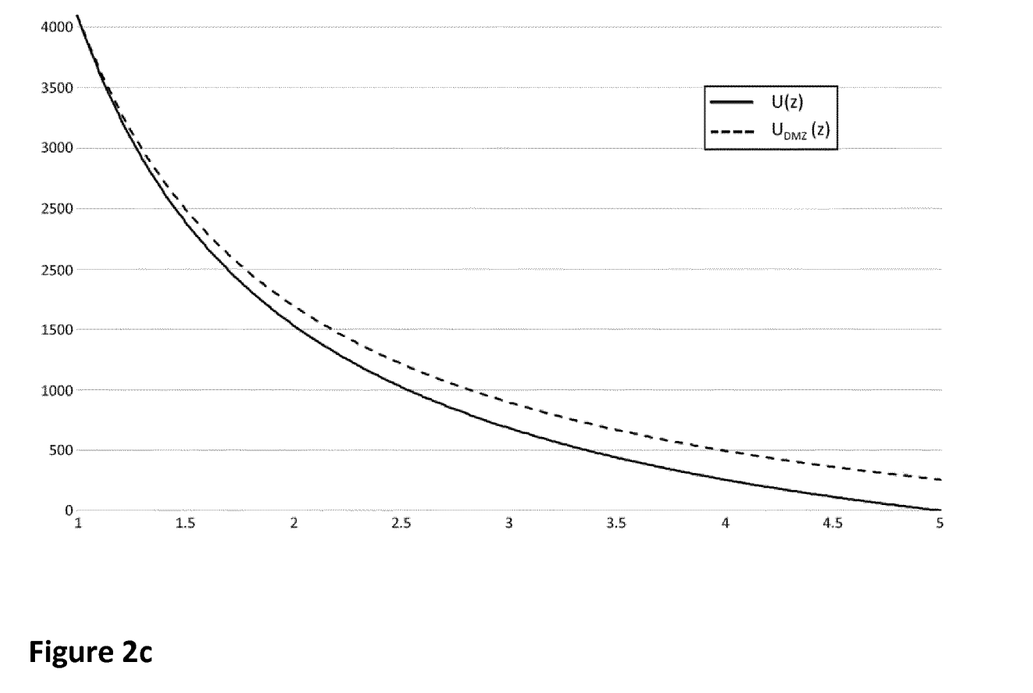
FIG. 2c illustrates curves corresponding respectively to a known quantization of useful data and to a modified quantization applied to useful data according to an embodiment of the disclosed method.

For example, U(z) is illustrated in FIG. 2c, in continuous line, for N=12, $z_{min}=1$ and $z_{max}=5$.

Thus, the disclosed method proposes to use a part of this dynamic given to U(z) to store the key information, when no useful data is associated with a coordinates in an image.

For example, in a first variant illustrated in FIG. 2b, a reserved range of DMZ values is defined at the beginning of the admissible dynamic, with DMZ<<$2^N$.

Indeed, as explained above, it is still less prejudicial to reserve the beginning of the range values, as the first values are used for distant objects (according to the clipped reverse function Z(z)).

In another variant, for example in case where the image do not correspond to a distance map, it can be better to use the end of the range values if the last values are used for storing less important information.

As already said, the size DMZ may be adapted so as to anticipate the fact that the encoding step will change the values stored in the distance map, for example in a maximum range of +/−(DMZ/2). This maximum range of change is adaptively adjusted depending on the compression level. This is illustrated on FIG. 2b, in relation with the first variant, wherein the dotted vertical line represents the value DMZ that may vary to split up the predetermined range of $2^N$ values into two ranges: the reserved range and the useful data range. Thus, the useful data stored in the distance image may take all the values from (DMZ+1) to ($2^N-1$).

Then, once the size DMZ has been defined, dedicated encoding and decoding process are implemented.

For example, on the encoding side, let's note V the value to store in the distance map/image, for a given position/coordinates in the image. As already said, the value V may be a useful data corresponding to the distance information associated to a coordinates or a key information for the undefined areas.

Thus, if no useful data is known for a current coordinates (e.g. no projection occurs at this specific part of the image) then a key information $V_k$ equal to 0 is stored in the distance image, 0 being a value belonging to the reserve range of size DMZ, at the beginning of the dynamic range of the distance values, in the first variant.

Else, if a distance value is known for a current coordinates (i.e. a projection occurs at this specific part of the image), a useful data should be stored, in the useful data range, i.e. in the predetermined range of $2^N$ values, except the beginning reserved for key information. Thus, in order to obtain the value to be stored, from the distance information, a modified quantization is applied to Z(z) and the value $V_u$ is stored, such as:

$$V_u = U_{DMZ}(z) = \text{floor}((2^N - DMZ)Z(z) + DMZ).$$

For example, $U_{DMZ}(z)$ is also illustrated in FIG. 2c, in dotted line, for N=12, $z_{min}=1$ and $z_{max}=5$.

Thus, according to the disclosed method, for each coordinates in the distance image, a value $V_u$ or $V_k$ (equal to 0 in the first variant) is stored, depending on whether a projection has occurred or not for the corresponding point. Then, the encoded image is compressed using an image or video compression method.

On the decoding side, for a received and decompressed image, let's note W the value read, possibly affected by a compression artifact. For a received image, the value DMZ is known by the decoder. The value DMZ may have been transmitted in the stream in association with the image. In a variant, a predefined value is set for DMZ. In another variant, the decoder implements a method to determine the value DMZ according to the received image.

According to the disclosed method, if the value W belongs to the reserved range of size DMZ (i.e. if W<DMZ, in the first variant), then the current value W may correspond to an undefined/unused point or may result from an encoding error of a <<true>> point (i.e. a useful data close to the reserved range before encoding but modified by the compression and thus belonging to the reserved range when decompressed by the decoder). As a consequence, such a point is discarded and considered as unused by the decoder. Indeed, even if a "true" point is discarded, due to compression artifact, it is less prejudicial to "loose" few useful data, moreover if they correspond to distant objects, than interpreting an undefined data as a useful data.

On the contrary, if the value W do not belong to the reserved range (i.e. if W>DMZ, in the first variant) then the current point is considered as a <<valid>> point and the associated distance value is recovered by computing $U_{DMZ}^{-1}(W)$ (i.e. the inversed quantization as the quantization applied on the encoding size).

Thus, according to the disclosed method, for each coordinates in a received distance image, a value W can be interpreted as a useful data or can be discarded if a key information is recognized.

Thus, the disclosed method allows a compact storage of a key information in an image, while providing robustness to encoding artifacts in a content/image and level of compression adaptive way.

For that, the disclosed method may take advantage of a dynamic range of values that could be considered as oversized regarding the values to be stored and/or the image itself and allows embedding a key information in an image without transmitting an additional image, thus optimizing the final bitrate for the image transmission.

Figure 3:
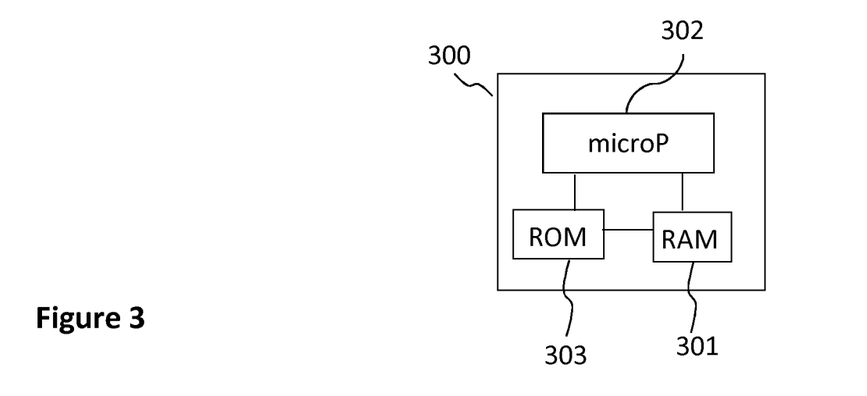
FIG. 3 is a schematic illustration of the structural blocks of an exemplary apparatus that can be used for implementing the disclosed method according to the embodiment disclosed in relation with FIGS. 2a to 2c.

Referring now to FIG. 3, the structural blocks of an exemplary apparatus that can be used for implementing the method for embedding a key information in an image, is illustrated, according to any of the embodiments disclosed above in relation with FIGS. 2a to 2c.

In an embodiment, an apparatus 300 for implementing the disclosed method comprises a non-volatile memory 303 (e.g. a read-only memory (ROM) or a hard disk), a volatile memory 301 (e.g. a random access memory or RAM) and a processor 302. The non-volatile memory 303 is a non-transitory computer-readable carrier medium. It stores executable program code instructions, which are executed by the processor 302 in order to enable implementation of the method described above in its various embodiments.

Upon initialization, the aforementioned program code instructions are transferred from the non-volatile memory 303 to the volatile memory 301 so as to be executed by the processor 302. The volatile memory 301 likewise includes registers for storing the variables and parameters required for this execution.

Naturally, the present disclosure is not limited to the embodiments previously described.

In particular, the present disclosure is not limited to a method and device for embedding a key information in an image but also extends to a method for encoding/decoding a packet comprising data representative of an object of a multimedia content and to any device implementing this method and notably any devices comprising at least one CPU and/or at least one GPU.

For example, the disclosed method may apply to volumetric or immersive videos.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for embedding values in pixels of an image, the method comprising:
reserving a first range of values within a predetermined second range of $2^N$ values used for storing values in pixels of the image, the first range being used for storing a key value indicating that the pixel is a non-useful pixel, and the second range of values deprived of the first range of values being used for storing useful values of the pixels of the image, with N greater than 0 and a number of values of the first range lower than $2^N$;
wherein the image corresponds to a distance map obtained after projection onto a parametric surface of a point cloud representing at least one part of an object in a multimedia content; and
wherein a useful value corresponds to information representative of a distance between the at least one part of the object and the parametric surface.

2. The method according to claim 1, comprising encoding the image and wherein the first range is updated according to a level of video compression applied for the encoding.

3. The method according to claim 1, wherein the first range is updated according to at least one characteristic of the image.

4. The method according to claim 1, comprising, for at least one pixel in the image:
when a non-useful value is associated with the pixel, storing a key value in the pixel, the key value belonging to the first range,
when a useful value is associated with the pixel:
applying a modified quantization to the useful value for providing a modified useful value, the modified quantization being determined according to the number of values of the first range, and
storing the modified value in the pixel.

5. The method according to claim 4, wherein the key value is set to a value $V_k=0$ and the modified useful values correspond to $V_u=U_{DMZ}(z)=\text{floor}((2^N-DMZ)Z(z)+DMZ)$, with z the distance value and $$Z(z) = \frac{z_{min}\left(\frac{z_{max}}{z} - 1\right)}{z_{max} - z_{min}}$$

where $z_{min}$ and $z_{max}$ define the clipping range with $Z(z_{min})=1$ and $Z(z_{max})=0$.

6. A method comprising:
decoding an image corresponding to a distance map obtained after projection onto a parametric surface of a point cloud representing at least one part of an object of a multimedia content by, for a value W read for at least one pixel in the image:
when W belongs to a reserved range provided for storing a key information indicating that the pixel is a non-useful pixel, discarding the read value W;
when W does not belong to the reserved range, recovering a useful value corresponding to the read value W by applying an inverse modified quantization to the read value W, the inverse modified quantization taking account of the reserved range.

7. A non-transitory medium storing data representative of an image embedding depth values, the image storing key values in a first range reserved in a second range of $2^N$ values used for storing useful values in the image, the key values being associated with at least one pixel of the image, and the second range of values deprived of the first range of values being used for storing values of the pixels of the image, with N greater than 0 and a number of values of the first range lower than $2^N$;
wherein the image corresponds to a distance map obtained after projection onto a parametric surface of a point cloud representing at least one part of an object in a multimedia content; and wherein a useful value corresponds to information representative of a distance between the at least one part of the object and the parametric surface.

8. An apparatus configured to embed a value in an image, the apparatus comprising:
    at least one processor; and
    at least one memory having stored instructions operative, when executed by the at least one processor, to cause the apparatus to:
    reserve a first range of values, in a second range of $2^N$ values used for storing useful values in the image, the first range being used for storing a key value that the pixel is a non-useful pixel, and the second range of values deprived of the first range of values being used for storing useful values of the pixels of the image, with N greater than 0 and a number of values of the first range lower than $2^N$;
    wherein the image corresponds to a distance map obtained after projection onto a parametric surface of a point cloud representing at least one part of an object in a multimedia content; and
    wherein a useful value corresponds to information representative of a distance between the at least one part of the object and the parametric surface.

9. An apparatus comprising:
    at least one processor; and
    at least one memory having stored instructions operative, when executed by the at least one processor, to cause the apparatus to:
    decode an image corresponding to a distance map obtained after projection onto a parametric surface of a point cloud representing at least one part of an object of a multimedia content by, for a value W read for at least one pixel in the image:
        when W belongs to a reserved first range of values, in a second range of $2^N$ values used for storing useful values in the image, the first range being used for storing a key value associated with at least one pixel in the image, and the second range of values deprived of the first range of values being used for storing values of the pixels of the image, with N greater than 0 and a number of values of the first range lower than $2^N$, discarding the read value W;
        when W does not belong to the reserved range, recovering a useful value corresponding to the read value W by applying an inverse modified quantization to the read value W, the inverse modified quantization taking account of the reserved range.

10. A non-transitory computer-readable carrier medium having stored therein instructions for causing a processor to perform a method of embedding values in pixels of an image, the method comprising reserving a first range of values within a predetermined second range of $2^N$ values used for storing values in pixels of the image, the first range being used for storing a key information value indicating that the pixel is a non-useful pixel, and the second range of values deprived of the first range of values being used for storing values of the pixels of the image, with N greater than 0 and a number of values of the first range significantly lower than $2^N$;
    wherein the image corresponds to a distance map obtained after projection onto a parametric surface of a point cloud representing at least one part of an object in a multimedia content; and
    wherein a useful value corresponds to information representative of a distance between the at least one part of the object and the parametric surface.

11. The apparatus according to claim 8, wherein the processor is configured for encoding the image and wherein the first range is updated according to a level of video compression applied for the encoding.

12. The apparatus according to claim 8, wherein the first range is updated according to at least one characteristic of the image.

13. The apparatus according to claim 8, wherein the processor is configured for, for at least one pixel in the image:
    when a non-useful value is associated with the pixel, storing a key value in the pixel, the key value belonging to the first range,
    when a useful value is associated with the pixel:
        applying a modified quantization to the useful value for providing a modified useful value, the modified quantization being determined according to the number of values of the first range, and
        storing the modified value in the pixel.

14. The apparatus according to claim 13, wherein the key value is set to a value $V_k=0$ and the modified useful values correspond to $V_u=U_{DMZ}(z)=\text{floor}((2^N-DMZ)Z(z)+DMZ)$, with z the distance value and $$Z(z) = \frac{z_{min}\left(\frac{z_{max}}{z}-1\right)}{z_{max}-z_{min}}$$

where $z_{min}$ and $z_{max}$ define the clipping range with $Z(z_{min})=1$ and $Z(z_{max})=0$.

* * * * *

UNITED STATES PATENT AND TRADEMARK OFFICE
CERTIFICATE OF CORRECTION

PATENT NO. : 11,064,213 B2
APPLICATION NO. : 16/472761
DATED : July 13, 2021
INVENTOR(S) : Julien Fleureau, Renaud Dore and Thierry Tapie

Page 1 of 1

It is certified that error appears in the above-identified patent and that said Letters Patent is hereby corrected as shown below:

In the Claims

At Column 12, Line 9, Claim 10, after "range" delete "significantly".

Signed and Sealed this
Twenty-sixth Day of December, 2023

Katherine Kelly Vidal
*Director of the United States Patent and Trademark Office*